United States Patent
Canning et al.

(10) Patent No.: US 7,424,644 B2
(45) Date of Patent: Sep. 9, 2008

(54) METHOD AND SYSTEM FOR RECOVERING DATA FROM A HUNG APPLICATION

(75) Inventors: Benjamin E. Canning, Seattle, WA (US); Jeffery D. Mitchell, Bellevue, WA (US); Thomas S. Coon, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 575 days.

(21) Appl. No.: 11/070,449

(22) Filed: Mar. 1, 2005

(65) Prior Publication Data

US 2006/0200702 A1    Sep. 7, 2006

(51) Int. Cl.
    *G06F 11/00* (2006.01)
(52) U.S. Cl. .......................................... 714/34; 714/38
(58) Field of Classification Search ............... 714/38, 714/34
    See application file for complete search history.

(56) References Cited

U.S. PATENT DOCUMENTS

| | | | |
|---|---|---|---|
| 4,352,157 A | 9/1982 | Namimoto et al. ........... 711/202 |
| 5,684,986 A | 11/1997 | Moertl et al. ................ 707/101 |
| 6,009,258 A | 12/1999 | Elliott ........................... 703/22 |
| 6,263,489 B1 | 7/2001 | Olsen et al. ................... 717/129 |
| 6,434,741 B1 | 8/2002 | Mirani et al. ................ 717/124 |
| 6,591,379 B1* | 7/2003 | LeVine et al. .................. 714/38 |
| 6,593,940 B1* | 7/2003 | Petersen et al. ............... 715/700 |
| 2005/0081115 A1* | 4/2005 | Cheng et al. ................... 714/47 |
| 2005/0235136 A1* | 10/2005 | Barsotti et al. .................. 713/1 |

* cited by examiner

*Primary Examiner*—Robert W Beausoliel, Jr.
*Assistant Examiner*—Amine Riad
(74) *Attorney, Agent, or Firm*—Merchant & Gould; Ryan T. Grace

(57) ABSTRACT

An application is associated with a main thread that is running on an operating system. A secondary thread monitors the main thread to determine whether the application is in a hang state. A ghost window that matches the hung application window is displayed on a user interface and the hung application is hidden from view. An application crash is attempted on the main thread when the user closes the ghost window. If the crash is successful, any unsaved data associated with the hung application is recovered. Error information associated with the cause of the application hang may also be collected.

20 Claims, 3 Drawing Sheets

METHOD AND SYSTEM FOR RECOVERING DATA FROM A HUNG APPLICATION

BACKGROUND

Despite the best efforts of software developers, software programs inevitably fail at one time or another. One type of failure that a software program may encounter is referred to as a hang. A hang occurs when a program module is running and results in the suspension of the operation of the program module. A hang may occur when a program module is stuck in a loop of code. Hangs are frustrating to users and, in some cases, may cause the user to lose work in the form of unsaved data.

In the past, users coped with hangs by rebooting the computer that was running the hung program module or by forcing the application program to quit. The user's decision to reboot or quit usually occurred after the user tried, to no avail, to get the application program to respond to user input. Rebooting the computer releases the application program from the hung state. However, unsaved data from the hung program module may be lost when the computer is rebooted.

An injection tool may be used to inject a crash into a hung application to enable data recovery. The crash causes exception handling code to run. The exception handling code saves any open documents and enables the recovery of data from the documents when the application restarts. However, the user must be aware of the existence of the injection tool. The user must also know how to execute the injection tool at the appropriate time.

SUMMARY

The present disclosure is directed to a method and system for recovering data from a hung application. The application is associated with a main thread that is running on an operating system. The application is considered to be hung when the main thread is unresponsive for a predetermined time period. A secondary thread monitors the main thread to determine whether the application is in a hang state.

The operating system detects when the application is in a hung state. When the application is determined to be in a hang state, the main thread registers with a hang manager module. As part of the registration process, the operating system creates a ghost window that shares many of the same properties as the hung application window. The operating system copies the contents of the image displayed in the hung application window and displays the contents in the ghost window. The operating system then hides the hung application window and displays the ghost window on a user interface. Text in the ghost window informs a user that the application is in a hang state. The user may choose to close the ghost window. A message associated with the ghost window is sent to the hang manager module in response to the user closing the ghost window such that code in the hang manager module is triggered to run rather than code in the operating system.

The secondary thread launches a monitoring executable when an application hang is detected. The monitoring executable is associated with the ghost window such that when the ghost window is closed the user is prompted to confirm termination of the application. If the user confirms termination, the monitoring executable calls the secondary thread which attempts to cause the main thread to force an application crash. A data recovery executable is also triggered to recover any unsaved data associated with the hung application. If the secondary thread is successful in causing main thread to crash, the application window unregisters with the hang manager module. The monitoring executable may also be triggered to collect error information associated with the cause of the application hang.

In accordance with one aspect of the invention, a determination is made that the application is hung. The hung application is displayed in a hung application window. A ghost window is displayed on a user interface. The ghost window shares properties with the hung application window. The ghost window indicates that the application is hung. User input is received to close the ghost window. An attempt is made to crash the application. Unsaved data associated with the hung application is recovered when the application is crashed.

DETAILED DESCRIPTION OF THE PREFERRED EMBODIMENT

The present disclosure is directed to a method and system for recovering data from a hung application. The application is associated with a main thread that is running on an operating system. A secondary thread monitors the main thread to determine whether the application is in a hang state. A ghost window that shares many of the same properties as the hung application window is displayed on a user interface and the hung application window is hidden from view. An application crash is attempted on the main thread when the user closes the ghost window and the application is still unresponsive. If the crash is successful, an attempt is made to recover any unsaved data associated with the hung application. Error information associated with the cause of the application hang may also be collected.

Embodiments of the present invention now will be described more fully hereinafter with reference to the accompanying drawings, which form a part hereof, and which show, by way of illustration, specific exemplary embodiments for practicing the invention. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Illustrative Operating Environment

Figure 1:
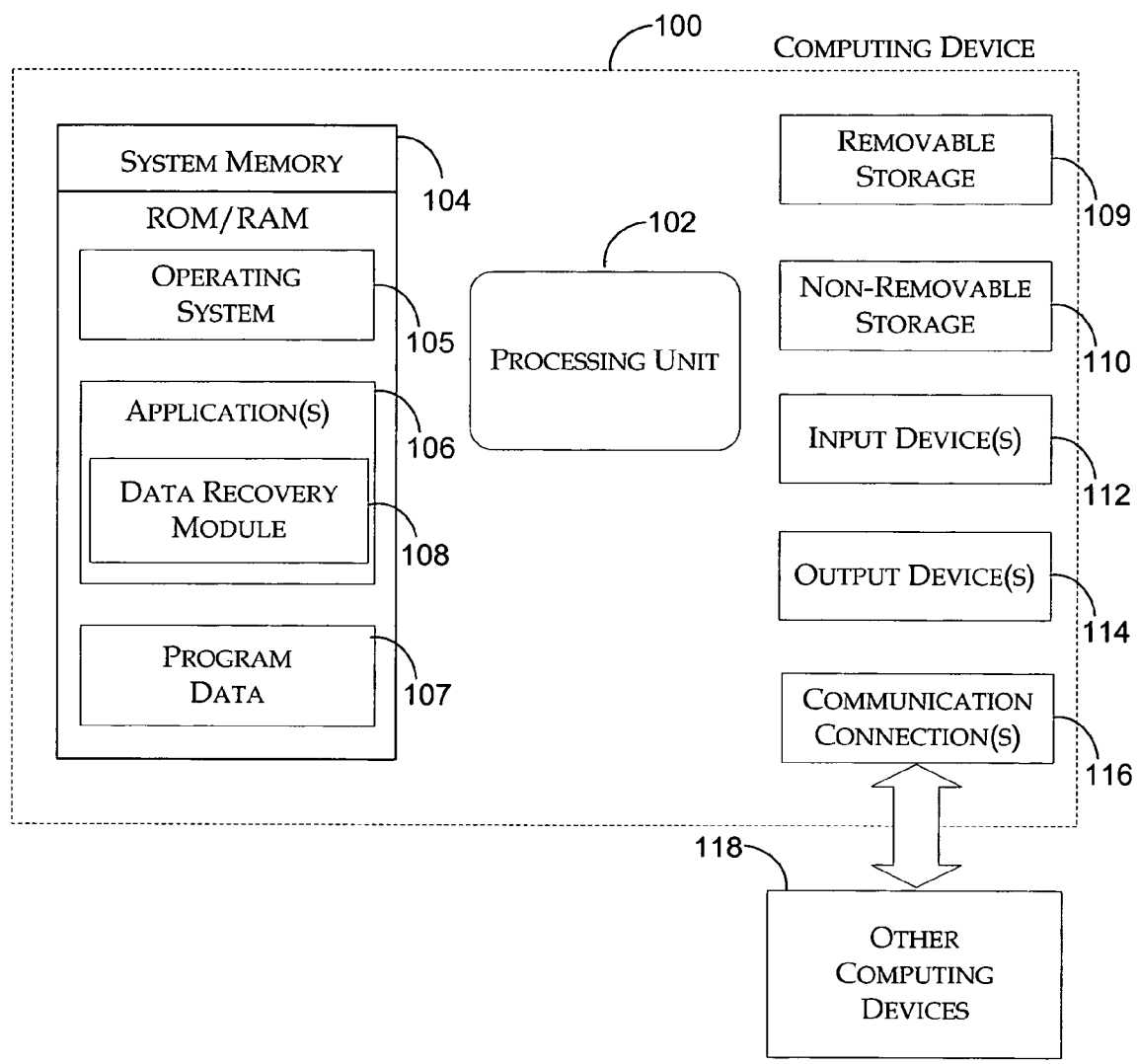
FIG. 1 illustrates a computing device that may be used according to an example embodiment of the present invention.
Figure 2:
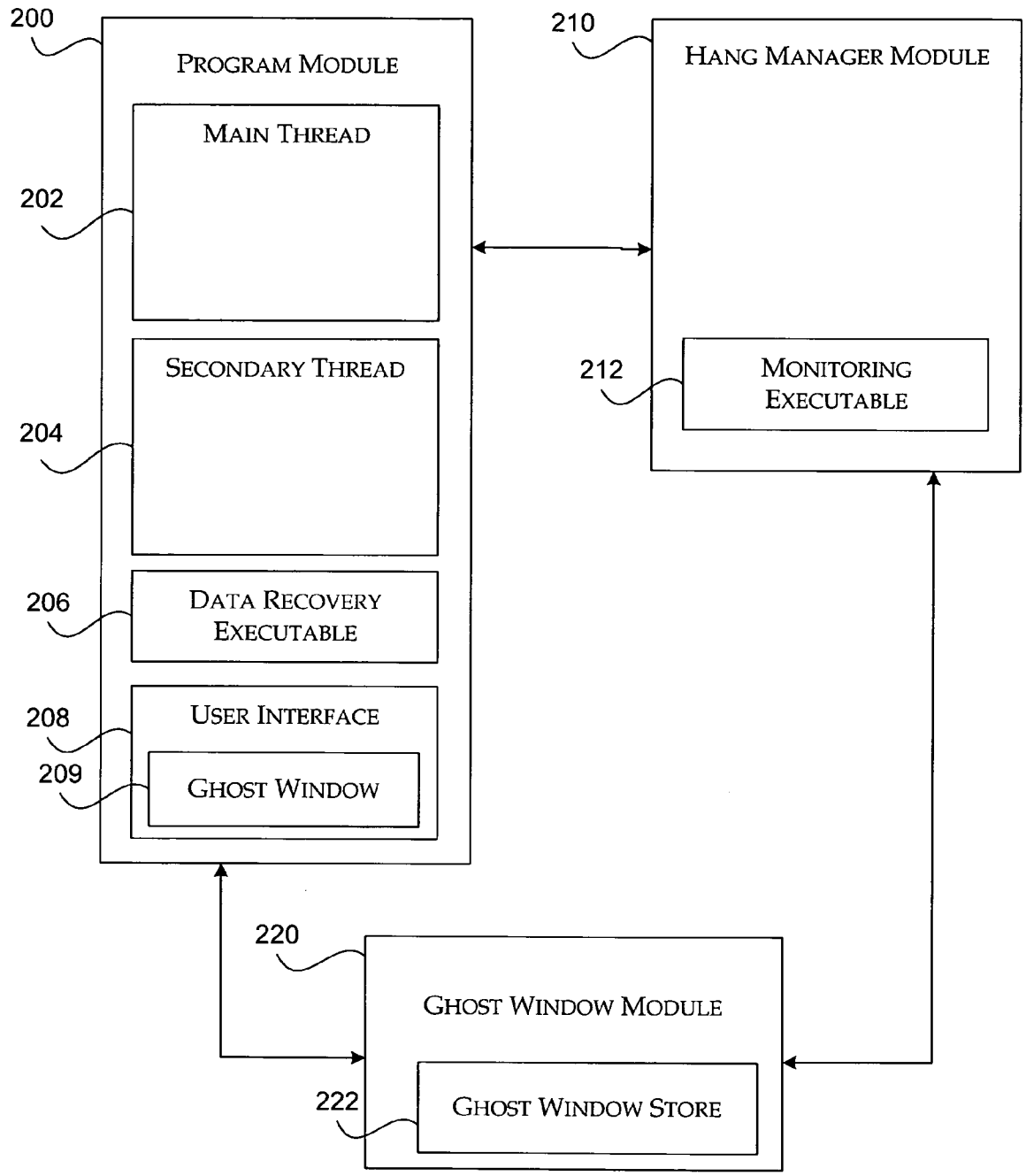
FIG. 2 illustrates a block diagram illustrating a system for recovering data from a hung application, in accordance with at least one feature of the present invention.
Figure 3:
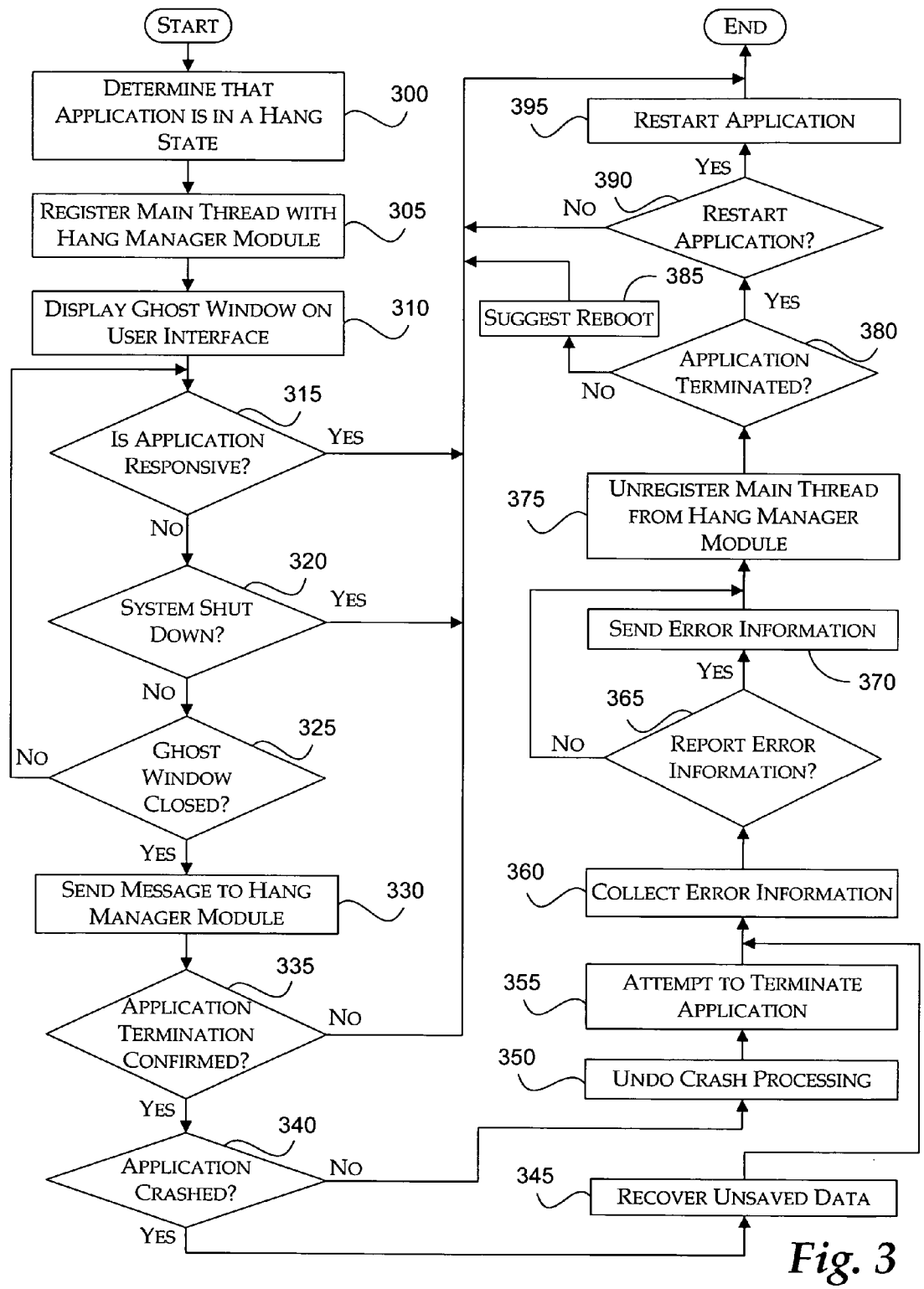
FIG. 3 illustrates an operational flow diagram illustrating a process for recovering data from a hung application, in accordance with at least one feature of the present invention.

With reference to FIG. 1, one example system for implementing the invention includes a computing device, such as computing device 100. Computing device 100 may be configured as a client, a server, a mobile device, or any other computing device that interacts with data in a network based collaboration system. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. A data recovery module 108, which is described in detail below with reference to FIGS. 2 and 3, is implemented within applications 106.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 also contains communication connections 116 that allow the device to communicate with other computing devices 118, such as over a network. Networks include local area networks and wide area networks, as well as other large scale networks including, but not limited to, intranets and extranets. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Recovering Data from a Hung Application

FIG. 2 illustrates a block diagram of a system for recovering data from a hung application. The system includes program module 200, hang manager module 210, and ghost window module 220. Ghost window module 220 is coupled to program module 200 and hang manager module 210. Program module 200 is coupled to hang manager module 210. Program module includes main thread 202, secondary thread 204, data recovery executable 206, and user interface 208. User interface 208 displays ghost window 209. Hang manager module 210 includes monitoring executable 212. Ghost window module 220 includes ghost window store 222.

Program module 200 corresponds to any application running on an operating system. Main thread 202 is code associated with the application. The application is considered to be hung when main thread 202 is unresponsive for a predetermined time period. Main thread 202 is determined to be unresponsive when main thread 202 does not respond to user input, or does not process individual messages within a predetermined period of time (e.g., more than 5 seconds elapse between message calls).

Secondary thread 204 monitors main thread 202 to determine whether the application is in a hung state. When the application is determined to be in a hung state, main thread 202 registers with hang manager module 210. As part of the registration process, ghost window store 222 retrieves a ghost window (e.g., ghost window 209) that matches the hung application window. Ghost window 209 shares many of the same properties as the hung application window. For example, the size and location of ghost window 209 is the same as the size and location of the hung application window. Ghost window 209 is displayed on user interface 208 directly in front of the hung application window such that the hung application window is hidden from view. In one embodiment, ghost window store 222 includes references to ghost windows that correspond to applications that are supported by hang manager module 210. In other words, if a particular application is in a hang state and a corresponding ghost window cannot be located in ghost window store 222 then that application is not supported.

Text in ghost window 209 displayed on user interface 208 informs a user that the application is in a hang state. For example, the user may be presented with text that reads, "The application is not responding." The user may choose to close ghost window 209 (e.g., by clicking the "X" in the upper right hand corner of the window, right clicking a mouse and selecting "Close", etc.). A message associated with ghost window 209 is sent to hang manager module 210 in response to the user closing ghost window 209. In one embodiment, the user may shut down the operating system rather than closing ghost window 209. In another embodiment, the application becomes responsive again. If the application becomes unhung, main thread 202 continues processing messages and unregisters itself with hang manager module 210.

In response to receiving the message from ghost window 209 when the application is still in a hang state, hang manager module 210 presents text on user interface 208 that prompts the user to confirm that the application is to be terminated. For example, the text may read, "Are you sure that you want to terminate the application?" The user may select to terminate the application. Alternatively, the user may cancel the request and the application remains in the hang state.

Secondary thread 204 launches monitoring executable 212 when the user chooses to terminate the application. Monitoring executable 212 calls secondary thread 204 which attempts to force an application crash on main thread 202. Code in program module 200 attempts to recover any unsaved data associated with the hung application. If secondary thread 204 is successful in causing main thread 202 to crash, the application window unregisters with hang manager module 210.

Monitoring executable 212 also collects error information associated with the cause of the application hang. In one embodiment, the error information includes the location in main thread where the hang occurred. Monitoring executable 212 displays a dialog on user interface 208 that prompts the user whether the error information should be reported to the operating system manufacturer. The error information is useful to the operating system manufacturer when developing subsequent versions of the operating system. The user may also be prompted to restart the application.

In one embodiment, secondary thread 204 may not be able to cause the hung application to crash on main thread 202 after a predetermined period of time has elapsed. Thus, any unsaved data associated with the application may not be recoverable. In one embodiment, any processing performed by secondary thread 204 on main thread 202 to attempt an application crash is undone to return main thread 202 to its original hung state. Monitoring executable 212 is still triggered to determine whether the user desires to report the error information and/or restart the application. User interface 208 receives user input to the error reporting prompt. Hang manager module 210 then unregisters the application window and terminates the application. The application may automatically restart. Alternatively, the application restarts in response to user input.

In another embodiment, the hung application cannot be terminated by secondary thread 204 or by the operating system. Hang manager module 210 prompts the user to reboot the operating system to overcome the hung application. If the user reboots the operating system, any unsaved data associated with the application cannot be recovered, and information associated with the error that caused the application to hang cannot be reported to the operating system manufacturer.

FIG. 3 an operational flow diagram illustrating a process for recovering data from a hung application. The process begins at a start block where a main thread of an application is running on an operating system.

A determination is made that the application is in a hang state at block 300. The application is determined to be in a hang state when the main thread is unresponsive for a predetermined period of time. A secondary thread monitors the main thread to determine whether the main thread is unresponsive. In one embodiment, the main thread is determined to unresponsive when the main thread is unresponsive to user input. In another embodiment, the main thread is determined to unresponsive when the main thread does not process individual messages within a predetermined time period.

Proceeding to block 305, the main thread is registered with a hang manager module. The hung application window is matched to a ghost window. The ghost window includes a copy of the image contents of the hung application window. The ghost window shares many of the same properties as the hung application window. Advancing to block 310, the ghost window is displayed on a user interface in front of the hung application window. The hung application window is hidden from view. Text in the ghost window informs the user that the application is in a hang state.

Transitioning to decision block 315, a determination is made whether the application is responsive. The application becomes responsive when the main thread continues to process messages (i.e., the application is no longer in a hang state). If the application is responsive, the main thread unregisters from the hang manager module and processing terminates at an end block. If the application remains unresponsive, processing continues to decision block 320.

Continuing to decision block 320, a determination is made whether the operating system has been shut down. The user may shut down the operating system when informed that the application is in a hang state. If the operating system has been shut down, processing terminates at the end block. If the operating system has not been shut down, processing proceeds to decision block 325.

Moving to decision block 325, a determination is made whether the ghost window has been closed after a predetermined period of time has elapsed. The user may close the window in several different ways (e.g., by clicking the "X" in the upper right hand corner of the window, right clicking a mouse and selecting "Close", etc.). If the ghost window has not been closed, processing returns to decision block 315. If the ghost window has been closed, processing proceeds to block 330 where a message associated with the ghost window is sent to the hang manager module.

Proceeding to decision block 335, a determination is made whether a user has confirmed termination of the application. The hang manager module presents a dialog on the user interface that prompts the user to confirm that the application is to be terminated. If application termination has not been confirmed, the application remains in the hang state and processing terminates at the end block. If confirmation of application termination has been received, processing proceeds to decision block 340.

Advancing to decision block 340, a determination is made whether the application has crashed after a predetermined period of time has elapsed. The secondary thread triggers a monitoring executable to call the main thread and attempt to force the application to crash. If application has not crashed, processing continues at block 350. If the application has crashed, processing proceeds to block 345 where any unsaved data is recovered from the crashed application. Processing then continues at block 360. Transitioning to block 350, any crash processing performed by the monitoring executable on the main thread is undone such that the main thread is returned to its original hang state. Moving to block 355, the operating system attempts to terminate the application.

Continuing to block 360, error information associated with the cause of the application hang is collected. In one embodiment, the error information includes the location in the main thread where the hang occurred. Moving to decision block 365, a determination is made whether the error information is to be reported to the operating system manufacturer. The monitoring executable may display a dialog on the user interface that prompts the user whether the error information should be reported to the operating system manufacturer. If the user does not want to report the error information, processing continues at block 375. If the error information is to be reported to the operating system manufacturer, processing proceeds to block 370 where the error information is sent to the operating system manufacturer. In one embodiment, the error message is sent over the Internet.

Proceeding to block 375, the main thread is unregistered from the hang manager module. Advancing to decision block 380, a determination is made whether the application has been successfully terminated. If the application could not be successfully terminated, processing continues at block 385 where the user is presented with a dialog on the user interface that suggests rebooting the operating system. Processing then terminates at the end block. If the application has been successfully terminated the application, processing proceeds to decision block 390.

Transitioning to decision block 390, a determination is made whether the user has selected to restart the application. In one embodiment, the application is automatically restarted. In another embodiment, the user may be prompted with a dialog on the user interface to restart the application. If the application has not been selected to be restarted, processing terminates at the end block. If the user has selected to restart the application, processing proceeds to block 395 where the application is restarted. Processing then terminates at the end block.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for recovering data from a hung application, the method comprising:
   monitoring a main thread of an application to determine whether the main thread is in a hung state, wherein the main thread is monitored by a second thread of the application program;
   in response to the second thread of the application determining that the main thread is in a hung state, automatically registering the main thread with a hung manager module and displaying a ghost window over a hung application window to hide the hung application window, wherein the ghost window includes a size property of the hung application window and a location property of the hung application window; and
   in response to an input to close the ghost window, launching a monitoring executable of the hung manager module to call the second thread, wherein the second thread is called to crash the main thread.

2. The computer-implemented method of claim 1, wherein monitoring the main thread of the application includes the second thread monitoring the main thread to determine whether at least one member of a group comprising: the main thread fails to respond to a user input, and the main thread fails to process a message within a predetermined period of time.

3. The computer-implemented method of claim 1, further comprising accessing a ghost window store that includes a reference to the ghost window, wherein the reference to the ghost window store corresponds to the application.

4. The computer-implemented method of claim 1, wherein the ghost window includes a copy of image contents of the hung application window.

5. The computer-implemented method of claim 1, wherein the hung application window is unregistered when the application is crashed.

6. The computer-implemented method of claim 1, wherein the monitoring executable is configured to collect error information associated with a cause of a hang of the main thread.

7. The computer-implemented method of claim 1, wherein the monitoring executable is configured to report error information associated with a cause of a hand of the main thread.

8. A computer-readable storage medium having computer executable instructions for recovering data from a hung application, the instructions comprising:
   monitoring a main thread of an application to determine whether the main thread is in a hung state, wherein the main thread is monitored by a second thread of the application program;
   in response to the second thread of the application determining that the main thread is in a hung state, automatically registering the main thread with a hung manager module and displaying a ghost window over a hung application window to hide the hung application window; and
   in response to an input to close the ghost window, launching a monitoring executable of the hung manager module to call the second thread, wherein the second thread is called to crash the main thread.

9. The computer-readable storage medium of claim 8, wherein monitoring the main thread of the application includes the second thread monitoring the main thread to determine whether at least one member of a group comprising: the main thread fails to respond to a user input, and the main thread fails to process a message within a predetermined period of time.

10. The computer-readable storage medium of claim 8, further comprising accessing a ghost window store that includes a reference to the ghost window, wherein the reference to the ghost window store corresponds to the application.

11. The computer-readable storage medium of claim 8, wherein the ghost window includes a copy of image contents of the hung application window.

12. The computer-readable storage medium of claim 8, wherein the hung application window is unregistered when the application is crashed.

13. The computer-readable storage medium of claim 8, wherein the monitoring executable is configured to collect error information associated with a cause of a hang of the main thread.

14. The computer-readable storage medium of claim 8, wherein the monitoring executable is configured to report error information associated with a cause of a hand of the main thread.

15. A system for recovering data from a hung application, the instructions comprising:
   a processor; and
   a memory having computer-executable instructions stored thereon for:
      monitoring a main thread of an application to determine whether the main thread is in a hung state, wherein the main thread is monitored by a second thread of the application program;
      in response to the second thread of the application determining that the main thread is in a hung state, automatically registering the main thread with a hung manager module and displaying a ghost window; and
      in response to an input to close the ghost window, launching a monitoring executable of the hung manager module to call the second thread, wherein the second thread is called to crash the main thread.

16. The system of claim 15, wherein monitoring the main thread of the application includes the second thread monitoring the main thread to determine whether at least one member of a group comprising: the main thread fails to respond to a user input, and the main thread fails to process a message within a predetermined period of time.

17. The system of claim 15, further comprising accessing a ghost window store that includes a reference to the ghost window, wherein the reference to the ghost window store corresponds to the application.

18. The system of claim 15, wherein the ghost window includes a copy of image contents of the hung application window.

19. The system of claim 15, wherein the hung application window is unregistered when the application is crashed.

20. The system of claim 15, wherein the monitoring executable is configured to collect error information associated with a cause of a hang of the main thread.

* * * * *